United States Patent
Ni et al.

(10) Patent No.: US 10,681,532 B2
(45) Date of Patent: Jun. 9, 2020

(54) MULTI-CARD MOBILE TERMINAL, AND SERVICE SWITCHING METHOD AND DEVICE THEREOF

(71) Applicant: SPREADTRUM COMMUNICATIONS (SHANGHAI) CO., LTD., Zhangjiang, Shanghai (CN)

(72) Inventors: Jinjin Ni, Shanghai (CN); Xianliang Chen, Shanghai (CN); Xichun Gao, Shanghai (CN); Yi He, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/800,644

(22) Filed: Nov. 1, 2017

(65) Prior Publication Data
US 2018/0132097 A1 May 10, 2018

(30) Foreign Application Priority Data
Nov. 8, 2016 (CN) .......................... 2016 1 0981612

(51) Int. Cl.
*H04B 1/38* (2015.01)
*H04W 8/18* (2009.01)
(Continued)

(52) U.S. Cl.
CPC .......... *H04W 8/183* (2013.01); *H04B 1/3816* (2013.01); *H04L 65/1016* (2013.01);
(Continued)

(58) Field of Classification Search
CPC .... H04W 8/183; H04W 88/06; H04B 1/3816; H04L 65/1016
(Continued)

(56) References Cited

U.S. PATENT DOCUMENTS 9,531,831 B1 * 12/2016 Cuadrat ................ H04L 67/303
2014/0087790 A1 * 3/2014 Babbage ............... H04W 8/183
455/558
(Continued)

FOREIGN PATENT DOCUMENTS

| CN | 101132378 A | 2/2008 |
| CN | 106028402 A | 10/2016 |
| WO | 2015156913 A1 | 10/2015 |

OTHER PUBLICATIONS

SIPO First Office Action corresponding to Application No. 201610981612.2; dated Sep. 25, 2019.

*Primary Examiner* — Edward F Urban
*Assistant Examiner* — Max Mathew
(74) *Attorney, Agent, or Firm* — Cantor Colburn LLP

(57) ABSTRACT

Multi-card mobile terminal, and service switching method and device thereof are provided. The method includes: when network mode switch is performed, switching a data transmission channel in a current network mode which performs multi-card service into a data transmission channel in a target network mode; updating a mapping relation between service identification of a corresponding subscriber identity card and the data transmission channel in the current network mode into a mapping relation between the service identification of the corresponding subscriber identity card and the data transmission channel in the target network mode; and performing multi-card service based on the mapping relation between the service identification of the corresponding subscriber identity card and the data transmission channel in the target network mode. For a multi-card mobile terminal which uses a same data transmission channel to perform multi-card service, the multi-card service may be continued when a network mode changes.

21 Claims, 2 Drawing Sheets

(51) Int. Cl.
  *H04L 29/06* (2006.01)
  *H04B 1/3816* (2015.01)
  *H04W 36/14* (2009.01)
  *H04W 88/06* (2009.01)

(52) U.S. Cl.
  CPC ......... *H04L 65/1073* (2013.01); *H04W 36/14* (2013.01); *H04W 88/06* (2013.01)

(58) Field of Classification Search
  USPC .......................................................... 455/558
  See application file for complete search history.

(56) References Cited

U.S. PATENT DOCUMENTS

| | | | | |
|---|---|---|---|---|
| 2014/0220952 A1* | 8/2014 | Holtmanns | ........... | H04W 8/183 455/418 |
| 2015/0056998 A1* | 2/2015 | Kaikkonen | ........... | H04W 76/19 455/436 |
| 2015/0350881 A1* | 12/2015 | Weiss | .................... | H04W 8/205 455/558 |
| 2015/0373778 A1* | 12/2015 | Holtmanns | .......... | H04W 8/205 455/558 |
| 2016/0180665 A1* | 6/2016 | Rogers | .................. | G08B 13/14 340/568.2 |
| 2016/0277174 A1* | 9/2016 | Burnic | ............. | H04W 56/0035 |
| 2016/0316372 A1* | 10/2016 | Daksiewicz | ............ | H04W 8/26 |
| 2016/0373920 A1* | 12/2016 | Petersson | ................ | G06F 21/34 |
| 2017/0034705 A1* | 2/2017 | Stocker | ................. | H04W 76/10 |
| 2017/0041866 A1* | 2/2017 | Sharma | ................. | H04W 48/18 |
| 2017/0048773 A1* | 2/2017 | Miao | .................... | H04W 36/14 |
| 2017/0070877 A1* | 3/2017 | Shi | ........................ | H04W 8/183 |
| 2017/0127217 A1* | 5/2017 | Miao | .................... | H04W 76/10 |
| 2017/0150545 A1* | 5/2017 | Ramkumar | ....... | H04W 52/0212 |
| 2017/0280380 A1* | 9/2017 | Gundu | ................. | H04B 1/3816 |
| 2017/0353939 A1* | 12/2017 | Behera | ................. | H04W 76/18 |
| 2017/0367125 A1* | 12/2017 | Krishnamoorthy | ... | H04W 76/10 |
| 2018/0124692 A1* | 5/2018 | Tan | .................... | H04W 52/0229 |
| 2018/0206103 A1* | 7/2018 | Ventrapragada | ...... | H04W 8/005 |

\* cited by examiner

MULTI-CARD MOBILE TERMINAL, AND SERVICE SWITCHING METHOD AND DEVICE THEREOF

CROSS-REFERENCE TO RELATED APPLICATIONS

The present invention claims priority under 35 U.S.C. § 119 to Chinese patent application No. 201610981612.2, filed on Nov. 8, 2016, the entire disclosure of which is incorporated herein by reference.

TECHNICAL FIELD

The present disclosure generally relates to communication technology field, and more particularly, to a multi-card mobile terminal, and service switching method and device thereof.

BACKGROUND

Mobile terminal denotes to any computer device used in motion, which generally includes mobile phone, notebook computer, tablet computer, POS device and on-vehicle computer. With the successive commercial use of various mobile networks, covering multiple network signals in a same area has become a common phenomenon, which leads to fierce competition of operators which operate different mobile networks, and brings to users more choices. To facilitate users' choosing a mobile network flexibly according to their own needs, most mobile terminals have multi-card multi-standby function, i.e., multi-card mobile terminals.

In an existing multi-card mobile terminal, when service requests are generated by multiple subscriber identity cards at the same time, the mobile terminal needs to set up a corresponding data transmission channel for each subscriber identity card. To reduce hardware cost and complexity of the multi-card mobile terminal, save radio transmission resources and meet users' service demand, methods of using a same data transmission channel in a same network mode to perform multi-card service have arisen.

However, when the network mode changes, the multi-card mobile terminal which uses the same data transmission channel to perform multi-card service may not be capable of performing service.

SUMMARY

In embodiments of the present disclosure, for a multi-card mobile terminal which uses a same data transmission channel to perform multi-card service, the multi-card service may be continued when a network mode changes.

In an embodiment of the present disclosure, a service switching method for a multi-card mobile terminal is provided, including: when network mode switch is performed, switching a data transmission channel in a current network mode which performs multi-card service into a data transmission channel in a target network mode, wherein the number of data transmission channels is less than the number of subscriber identity cards in the multi-card mobile terminal; updating a mapping relation between service identification of a corresponding subscriber identity card and the data transmission channel in the current network mode into a mapping relation between the service identification of the corresponding subscriber identity card and the data transmission channel in the target network mode; and performing multi-card service based on the mapping relation between the service identification of the corresponding subscriber identity card and the data transmission channel in the target network mode.

Optionally, the data transmission channel may include a data channel and a wireless connection.

Optionally, the data channel may include a default bearer and a dedicated bearer for IP Multimedia Subsystem (IMS) Public Data Network (PDN), or a service bearer of a future evolution network.

Optionally, the multi-card service may include call service.

Optionally, the network mode may include Global System for Mobile Communication (GSM), Code Division Multiple Access (CDMA), Wideband Code Division Multiple Access (WCDMA), Long Term Evolution (LTE), 5th generation communication (5G) or future evolution.

In an embodiment of the present disclosure, a service switching device for a multi-card mobile terminal is provided, including: a switching circuitry configured to: when network mode switch is performed, switch a data transmission channel in a current network mode which performs multi-card service into a data transmission channel in a target network mode, wherein the number of data transmission channels is less than the number of subscriber identity cards in the multi-card mobile terminal; a mapping circuitry configured to update a mapping relation between service identification of a corresponding subscriber identity card and the data transmission channel in the current network mode into a mapping relation between the service identification of the corresponding subscriber identity card and the data transmission channel in the target network mode; and a performing circuitry configured to perform multi-card service based on the mapping relation between the service identification of the corresponding subscriber identity card and the data transmission channel in the target network mode.

Optionally, the data transmission channel may include a data channel and a wireless connection.

Optionally, the data channel may include a default bearer and a dedicated bearer for IMS PDN, or a service bearer of a future evolution network.

Optionally, the multi-card service may include call service.

Optionally, the network mode may include GSM, CDMA, WCDMA, LTE, 5G or future evolution.

In an embodiment of the present disclosure, a multi-card mobile terminal is provided, including the above service switching device for the multi-card mobile terminal.

Embodiments of the present disclosure may provide following advantages. By establishing the mapping relation between service identification of multi-card service and data transmission channels in network modes, a mapping relation between service identification of multi-card service and a data transmission channel in a current network mode is updated into a mapping relation between the service identification of multi-card service and a data transmission channel in a target network mode, when network mode switch is performed. In this way, the multi-card mobile terminal may use the mapped service identification after the update to continue performing multi-card service through the data transmission channel in the target network mode, to realize continuation of the multi-card service.

DETAILED DESCRIPTION

In an existing multi-card mobile terminal, when a service request is generated by one subscriber identity card, the multi-card mobile terminal sets up a data transmission channel for the subscriber identity card and a network. When service requests are generated by multiple subscriber identity cards at the same time, the multi-card mobile terminal needs to set up a corresponding data transmission channel for each subscriber identity card. That is to say, in the existing multi-card mobile terminal which can provide service to multiple subscriber identity cards at the same time, the data transmission channels are corresponding to the subscriber identity cards respectively, which results in relatively high hardware cost and complexity of the multi-card mobile terminal.

To solve the above problems, a multi-card mobile terminal has arisen, which can use a same data transmission channel in a same network mode to perform multi-card service.

Figure 1:
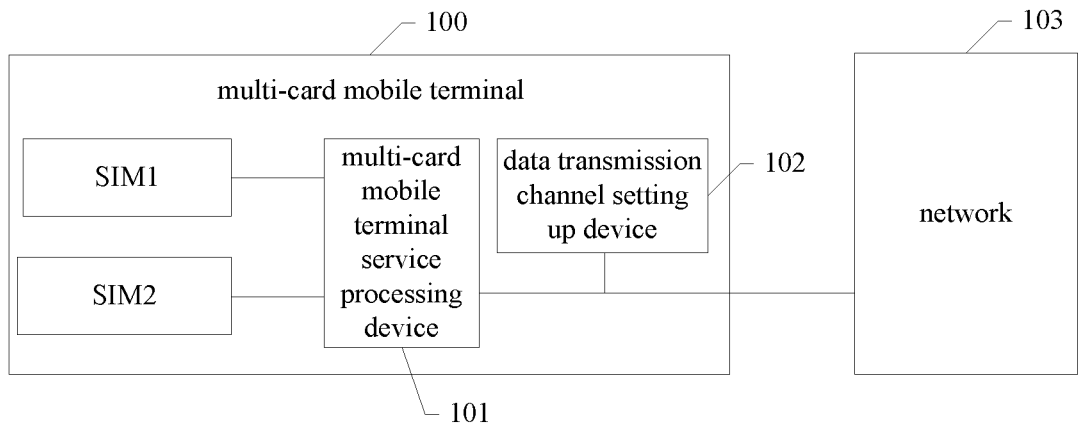
FIG. 1 schematically illustrates a structural diagram of a multi-card mobile terminal.

Referring to FIG. 1, take a multi-card mobile terminal including two subscriber identity cards for example. The multi-card mobile terminal 100 includes a first subscriber identity card SIM1, a second subscriber identity card SIM2, a multi-card mobile terminal service processing device 101 and a data transmission channel setting up device 102.

Assume that the first subscriber identity card SIM1 is a subscriber identity card initiating a service request, and the second subscriber identity card SIM2 is a subscriber identity card which has set up a data transmission channel with a network 103 via the data transmission channel setting up device 102. When receiving a service request from the first subscriber identity card SIM1, the multi-card mobile terminal service processing device 101 detects whether a data transmission channel has been set up with the network 103. If a data transmission channel set up by the second subscriber identity card SIM2 is detected, the multi-card mobile terminal service processing device 101 uses the data transmission channel set up by the second subscriber identity card SIM2 to process the service request from the first subscriber identity card SIM1.

From above, as the number of data transmission channel which has been set up is less than the number of subscriber identity cards in the multi-card mobile terminal, the number of circuits for setting up the data transmission channel in the multi-card mobile terminal is less than the number of subscriber identity cards in the multi-card mobile terminal, which effectively reduces hardware cost and complexity of the multi-card mobile terminal, and saves wireless network transmission resources.

However, there is no solution to continue and identify multi-card service when the multi-card mobile terminal needs to switch network mode.

In embodiments of the present disclosure, by establishing the mapping relation between service identifications of multi-card service and different network modes, when network mode switch is performed in a multi-card mobile terminal, service identification of multi-card service can be mapped from a data transmission channel in a current network mode to a data transmission channel in a target network mode. In this way, the multi-card mobile terminal may use the mapped service identification to continue performing multi-card service through the data transmission channel in the target network mode, to realize continuation of the multi-card service.

In order to clarify the object, solutions and advantages of embodiments of the present disclosure, embodiments of present disclosure will be described clearly in detail in conjunction with accompanying drawings.

Figure 2:
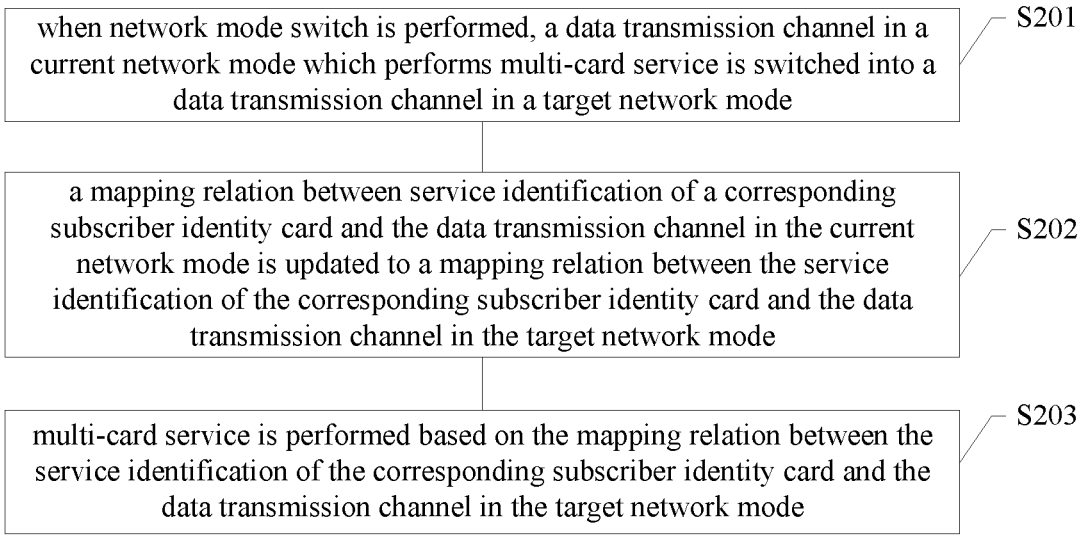
FIG. 2 schematically illustrates a flow chart of a service switching method for a multi-card mobile terminal according to an embodiment.

FIG. 2 schematically illustrates a flow chart of a service switching method for a multi-card mobile terminal according to an embodiment. The method may include steps S201, S202 and 203.

In S201, when network mode switch is performed, a data transmission channel in a current network mode which performs multi-card service is switched into a data transmission channel in a target network mode.

In some embodiments, in the current network mode, when the first subscriber identity card among the subscriber identity cards in the multi-card mobile terminal, i.e., the subscriber identity card SIM1, registers with an LTE network and IMS registration succeeds, a data transmission channel between the subscriber identity card SIM1 and a network is considered to be set up. The data transmission channel includes a data channel and a wireless connection, and the data channel may include a default bearer and a dedicated bearer for IMS PDN.

When other subscriber identity card in the multi-card mobile terminal needs to process service, the service may be processed through the detected data transmission channel corresponding to the subscriber identity card SIM1, i.e., the data transmission channel set up by the subscriber identity card SIM1 is the data transmission channel in the current network mode.

In some embodiments, when multiple subscriber identity cards SIM1 to SIMN in the multi-card mobile terminal are using the data transmission channel in the current network mode to perform service operation, the multi-card mobile terminal may need to switch from the current network mode to a target network mode due to effect of a particular factor, such as network coverage. In this situation, the multi-card mobile terminal may switch the data transmission channel carrying subscriber identity card service (i.e., carrying multi-card service) in the current network mode to the data transmission channel in the target network mode.

In some embodiments, the data transmission channels in both the current network mode and the target network mode are set up by the subscriber identity card registering with the LTE network. When the multi-card mobile terminal is switching from the current network mode to the target network mode, the subscribed identity card which sets up the data transmission channel in the current network mode may release the data transmission channel set up in the current network mode, and set up the data transmission channel in the target network mode, so as to carry service of the subscriber identity cards in the multi-card mobile terminal, i.e., the multi-card service.

In some embodiments, the number of data transmission channel in the current network mode may be one or more, and the number of data transmission channel is less than the number of subscriber identity cards in the multi-card mobile terminal. That is to say, in the multi-card mobile terminal, at least two subscriber identity cards use a same data transmission channel to perform service. When it is switched to the target network mode, the data transmission channel(s) in the target network mode may correspond to the data transmission channel(s) in the current network mode respectively, In S202, a mapping relation between service identification of a corresponding subscriber identity card and the data transmission channel in the current network mode is updated to a mapping relation between the service identification of the corresponding subscriber identity card and the data transmission channel in the target network mode.

In some embodiments, the same service in each subscriber identity card in the multi-card mobile terminal has different service identifications in different network modes. That is, service identifications of the subscriber identity card service have a predetermined corresponding relation with network modes of the multi-card mobile terminal. Based on the corresponding relation between the service identifications of the subscriber identity card and the network modes, the service identification of the subscriber identity card in a network mode may be mapped to the service identification in another network mode, that is, the mapping relation of the service identifications of the multi-card service between different network modes may be established.

When the multi-card mobile terminal is switched from the current network mode to the target network mode, and the subscriber identity card which sets up the data transmission channel in the current network mode finishes setting up the data transmission channel in the target network mode, the service identification of the multi-card service carried in the data transmission channel in the current network mode is mapped to the service identification in the data transmission channel in the target network mode. That is, the mapping relation between the service identification of the corresponding subscriber identity card and the data transmission channel in the current network mode is updated to the mapping relation between the service identification of the corresponding subscriber identity card and the data transmission channel in the target network mode. In this way, when the multi-card mobile terminal is switched from the current network mode to the target network mode, the multi-card service in the current network mode may be continued in the target network mode.

To improve compatibility, the service identifications of the multi-card service of the multi-card mobile terminal in different network modes may follow existing service identification. In mapping of service identifications, by setting up the mapping relation of service identifications of different services between different network modes, the service identification of the multi-card service carried in the data transmission channel in the current network mode may be mapped to the service identification in the data transmission channel in the target network mode. In some embodiments, the service identifications of the multi-card service in different network modes may be different from existing techniques, and may be set by those skilled in the art according to practical requirements, which are not limited here.

In S203, multi-card service is performed based on the mapping relation between the service identification of the corresponding subscriber identity card and the data transmission channel in the target network mode.

In some embodiments, after the service identification of the multi-card service carried in the data transmission channel in the current network mode is mapped to the service identification in the data transmission channel in the target network mode, the multi-card mobile terminal may use the service identification in the data transmission channel in the target network mode to process a service request of a subscriber identity card, i.e., perform multi-card service in the data transmission channel in the target network mode.

A communication system may also use the service identification in the data transmission channel in the target network mode to identify different services of a same subscriber identity card or a same service of different subscriber identity cards, so as to perform corresponding operations, such as billing. For clarity, the service switching method for the multi-card mobile terminal provided in embodiments of the present disclosure is described in detail below in conjunction with a specific instance.

Figure 3:
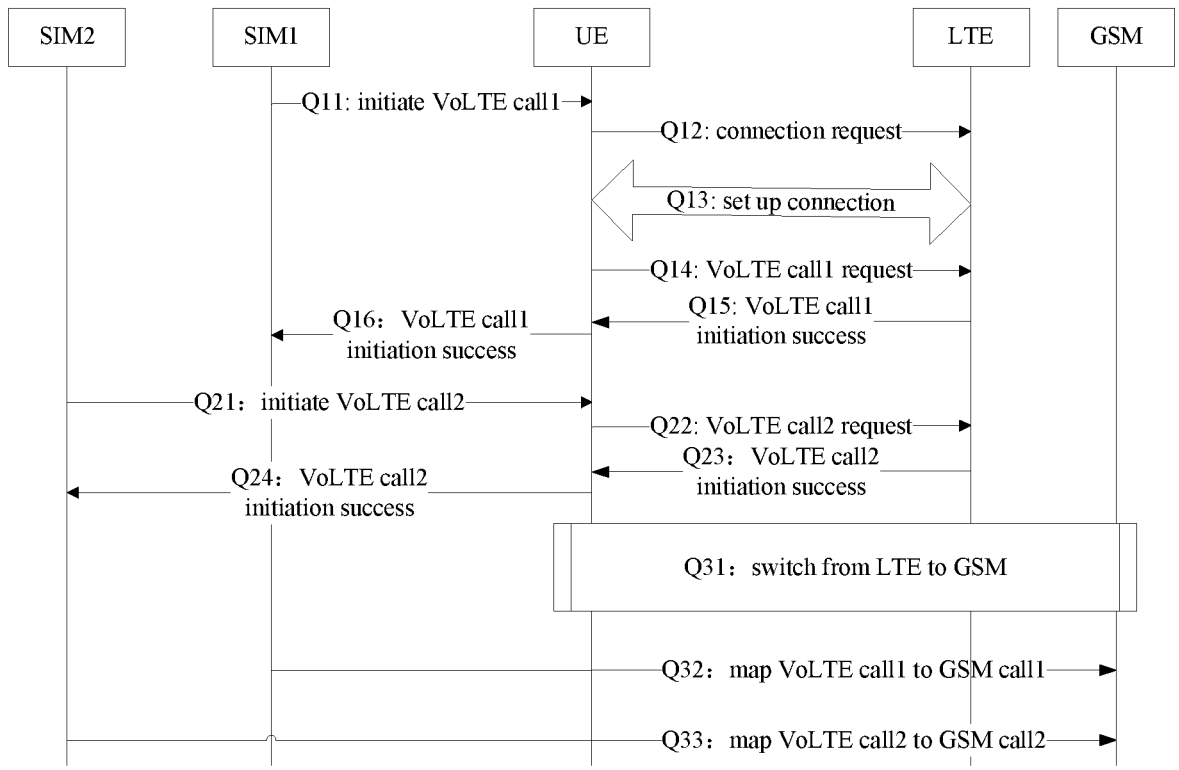
FIG. 3 schematically illustrates a signaling interaction diagram of a service switching method for a multi-card mobile terminal according to an embodiment.

Referring to FIG. 3, take a dual-card mobile terminal supporting LTE for example. The first subscriber identity card SIM1 registers with an LTE network and sets up a data transmission channel in the current LTE mode. Both the first subscriber identity card SIM1 and the second subscriber identity card SIM2 use the data transmission channel in the current LTE mode set up by the first subscriber identity card SIM1 to process service.

In the LTE mode, the first subscriber identity card SIM1 initiates a VoLTE call service request, i.e., a VoLTE call 1 service request Q11, to the dual-card mobile terminal. After receiving the VoLTE call 1 service request Q11 from the first subscriber identity card SIM1, the dual-card mobile terminal initiates a connection request Q12 to the LTE. After receiving the connection request Q12, the LTE sets up a data transmission channel for the first subscriber identity card SIM1, that is, the connection Q13 is set up between the LTE and the dual-card mobile terminal. Afterwards, the dual-card mobile terminal transmits a VoLTE call 1 request Q14 of the first subscriber identity card SIM1 to the LTE based on the data transmission channel. Afterwards, the LTE transmits VoLTE call 1 initiation success information Q15 to the dual-card mobile terminal, and the dual-card mobile terminal transmits VoLTE call 1 initiation success information Q16 to the first subscriber identity card SIM1. Afterwards, the data transmission channel set up by the first subscriber identity card SIM1 uses a corresponding VoLTE call ID11 to process VoLTE call service of the first subscriber identity card SIM1.

Similarly, the second subscriber identity card SIM2 initiates a VoLTE call service request, i.e., a VoLTE call 2 service request Q21, to the dual-card mobile terminal. After receiving the VoLTE call 2 service request Q21 from the second subscriber identity card SIM2, the dual-card mobile terminal initiates a VoLTE call 2 request Q22 to the LTE through the data transmission channel set up by the first subscriber identity card SIM1. Afterwards, the LTE transmits VoLTE call 2 initiation success information Q23 to the dual-card mobile terminal, and the dual-card mobile terminal transmits VoLTE call 2 initiation success information Q24 to the second subscriber identity card SIM2. Afterwards, the data transmission channel set up by the first subscriber identity card SIM1 uses a corresponding VoLTE call ID12 to process VoLTE call service of the second subscriber identity card SIM2.

When the dual-card mobile terminal moves to an area where LTE signals have poor quality, the dual-card mobile terminal is switched from LTE to GSM, and switches the data transmission channel in the LTE set up by the first subscriber identity card SIM1 to a data transmission channel Q31 in the GSM. Afterwards, the dual-card mobile terminal maps the VoLTE call ID11 in the LTE of the first subscriber identity card SIM1 to a GSM call ID21 in the data transmission channel in the GSM (i.e., Q32), and maps the VoLTE call ID12 in the LTE of the second subscriber identity card SIM2 to a GSM call ID22 in the data transmission channel in the GSM (i.e., Q33).

Based on above steps, the data transmission channel in the GSM may use the GSM call ID21 and GSM call ID22 to process GSM call service of the first subscriber identity card SIM1 and GSM call service of the second subscriber identity card SIM2, respectively, so that call service of the first subscriber identity card SIM1 and the second subscriber identity card SIM2 can be continued when the network mode switches from LTE to GSM.

For the network, the call service of the first subscriber identity card SIM1 and the second subscriber identity card SIM2 can be identified based on the GSM call ID21 and the GSM call ID22, and corresponding operations, such as billing, may be further performed.

In some embodiments, the multi-card mobile terminal may be switched among GSM, CDMA, WCDMA, LTE, 5G and network modes to be developed based on the existing network modes, i.e., future evolution. When the network mode is the future evolution, the data transmission channel may include a service bearer of a future evolution network which is used for network registration of the subscriber identity card and service processing of the subscriber identity card. The service switching method for the multi-card mobile terminal provided in embodiments of the present disclosure is described in detail above, and a corresponding device is described below.

Figure 4:
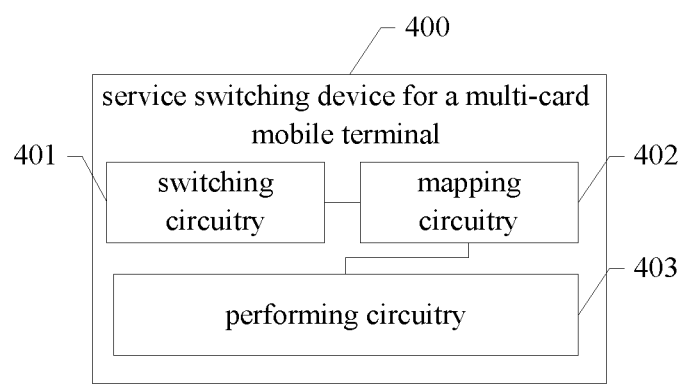
FIG. 4 schematically illustrates a structural diagram of a service switching device for a multi-card mobile terminal according to an embodiment.

FIG. 4 schematically illustrates a structural diagram of a service switching device for a multi-card mobile terminal according to an embodiment. Referring to FIG. 4, a service switching device 400 for a multi-card mobile terminal is provided, including a switching circuitry 401, a mapping circuitry 402 and a performing circuitry 403.

The switching circuitry 401 is configured to: when network mode switch is performed, switch a data transmission channel in a current network mode which performs multi-card service into a data transmission channel in a target network mode, wherein the number of data transmission channels is less than the number of subscriber identity cards in the multi-card mobile terminal, the data transmission channel may include a data channel and a wireless connection, and the data channel may include a default bearer and a dedicated bearer for IMS PDN, or a service bearer of a future evolution network.

In some embodiments, the multi-card service may include VoLTE call service.

In some embodiments, the network mode may include GSM, CDMA, WCDMA, LTE, 5G or future evolution.

The mapping circuitry 402 is configured to update a mapping relation between service identification of a corresponding subscriber identity card and the data transmission channel in the current network mode into a mapping relation between the service identification of the corresponding subscriber identity card and the data transmission channel in the target network mode.

The performing circuitry 403 is configured to perform multi-card service based on the mapping relation between the service identification of the corresponding subscriber identity card and the data transmission channel in the target network mode.

In an embodiment of the present disclosure, a multi-card mobile terminal is provided, including the above service switching device for the multi-card mobile terminal.

In embodiments of the present disclosure, by establishing the mapping relation between service identification of multi-card service and data transmission channels in network modes, a mapping relation between service identification of multi-card service and a data transmission channel in a current network mode is updated into a mapping relation between the service identification of multi-card service and a data transmission channel in a target network mode, when network mode switch is performed. In this way, the multi-card mobile terminal may use the mapped service identification after the update to continue performing multi-card service through the data transmission channel in the target network mode, to realize continuation of the multi-card service.

Those skilled in the art can understand that all of or a portion of the processes in the method provided in the above embodiments can be implemented by related hardware with instruction of computer program. The computer program may be stored in a readable storage medium, such as a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A service switching method for a multi-card mobile terminal, comprising:
when the multi-card mobile terminal switches from a current network mode to a target network mode, switching a data transmission channel in the current network mode to a data transmission channel in the target network mode, wherein before the switching, the data transmission channel in the current network mode is established by a first subscriber identity card, and used by the first subscriber identity card and a second subscriber identity card that are located in the multi-card mobile terminal, and after the switching, the data transmission channel in the target network mode is used by the first and second subscriber identity cards;
updating a mapping relation between service identification of the first and second subscriber identity cards and the data transmission channel in the current network mode into a mapping relation between the service identification of the first and second subscriber identity cards and the data transmission channel in the target network mode; and
performing multi-card service based on the mapping relation between the service identification of the first and second subscriber identity cards and the data transmission channel in the target network mode.

2. The method according to claim 1, wherein the data transmission channel comprises a data channel and a wireless connection.

3. The method according to claim 2, wherein the data channel comprises a default bearer and a dedicated bearer for IP Multimedia Subsystem (IMS) Public Data Network (PDN).

4. The method according to claim 1, wherein the multi-card service comprises call service.

5. The method according to claim 1, wherein the current or target network mode comprises Global System for Mobile Communication (GSM), Code Division Multiple Access (CDMA), Wideband Code Division Multiple Access (WCDMA), Long Term Evolution (LTE), $5^{th}$ generation communication (5G) or future evolution.

6. A service switching device for a multi-card mobile terminal, comprising:

a switching circuitry configured to: when the multi-card mobile terminal switches from a current network mode to a target network mode, switch a data transmission channel in the current network mode a data transmission channel in the target network mode, wherein before the switching, the data transmission channel in the current network mode is established by a first subscriber identity card, and used by the first subscriber identity card and a second subscriber identity card that are located in the multi-card mobile terminal, and after the switching, the data transmission channel in the target network mode is used by the first and second subscriber identity cards;

a mapping circuitry configured to update a mapping relation between service identification of the first and second subscriber identity cards and the data transmission channel in the current network mode into a mapping relation between the service identification of the first and second subscriber identity cards and the data transmission channel in the target network mode; and a performing circuitry configured to perform multi-card service based on the mapping relation between the service identification of the first and second subscriber identity cards and the data transmission channel in the target network mode.

7. The device according to claim 6, wherein the data transmission channel comprises a data channel and a wireless connection.

8. The device according to claim 7, wherein the data channel comprises a default bearer and a dedicated bearer for IP Multimedia Subsystem (IMS) Public Data Network (PDN).

9. The device according to claim 6, wherein the multi-card service comprises call service.

10. The device according to claim 6, wherein the current or target network mode comprises Global System for Mobile Communication (GSM), Code Division Multiple Access (CDMA), Wideband Code Division Multiple Access (WCDMA), Long Term Evolution (LTE), $5^{th}$ generation communication (5G) or future evolution.

11. A multi-card mobile terminal, comprising a service switching device for the multi-card mobile terminal, wherein the service switching device comprises:

a switching circuitry configured to: when the multi-card mobile terminal switches from a current network mode to a target network mode, switch a data transmission channel in the current network mode a data transmission channel in the target network mode, wherein before the switching, the data transmission channel in the current network mode is established by a first subscriber identity card, and used by the first subscriber identity card and a second subscriber identity card that are located in the multi-card mobile terminal, and after the switching, the data transmission channel in the target network mode is used by the first and second subscriber identity cards;

a mapping circuitry configured to update a mapping relation between service identification of the first and second subscriber identity cards and the data transmission channel in the current network mode into a mapping relation between the service identification of the first and second subscriber identity cards and the data transmission channel in the target network mode; and a performing circuitry configured to perform multi-card service based on the mapping relation between the service identification of the first and second subscriber identity cards and the data transmission channel in the target network mode.

12. The multi-card mobile terminal according to claim 11, wherein the data transmission channel comprises a data channel and a wireless connection.

13. The multi-card mobile terminal according to claim 12, wherein the data channel comprises a default bearer and a dedicated bearer for IP Multimedia Subsystem (IMS) Public Data Network (PDN).

14. The multi-card mobile terminal according to claim 11, wherein the multi-card service comprises call service.

15. The multi-card mobile terminal according to claim 11, wherein the current or target network mode comprises Global System for Mobile Communication (GSM), Code Division Multiple Access (CDMA), Wideband Code Division Multiple Access (WCDMA), Long Term Evolution (LTE), $5^{th}$ generation communication (5G) or future evolution.

16. The method according to claim 1, wherein the multi-card mobile terminal switching from the current network mode to the target network mode comprises both the first and second subscriber identity cards switching from the current network mode to the target network mode.

17. The method according to claim 1, wherein the current network mode is LTE and the target network mode is GSM, and updating a mapping relation between service identification of the first and second subscriber identity cards and the data transmission channel in the current network mode into a mapping relation between the service identification of the first and second subscriber identity cards and the data transmission channel in the target network mode comprises:

mapping a first VoLTE call via the data transmission channel in LTE of the first subscriber identity card to a first GSM call via the data transmission channel in GSM of the first subscriber identity card, and mapping a second VoLTE call via the data transmission channel in LTE of the second subscriber identity card to a second GSM call via the data transmission channel in GSM of the second subscriber identity card.

18. The device according to claim 6, wherein the multi-card mobile terminal switching from the current network mode to the target network mode comprises both the first and second subscriber identity cards switching from the current network mode to the target network mode.

19. The device according to claim 6, wherein the current network mode is LTE and the target network mode is GSM, and the mapping circuitry is configured to:

map a first VoLTE call via the data transmission channel in LTE of the first subscriber identity card to a first GSM call via the data transmission channel in GSM of the first subscriber identity card, and map a second VoLTE call via the data transmission channel in LTE of the second subscriber identity card to a second GSM call via the data transmission channel in GSM of the second subscriber identity card.

20. The multi-card mobile terminal according to claim 11, wherein the multi-card mobile terminal switching from the current network mode to the target network mode comprises both the first and second subscriber identity cards switching from the current network mode to the target network mode.

21. The multi-card mobile terminal according to claim 11, wherein the current network mode is LTE and the target network mode is GSM, and the mapping circuitry is configured to:

map a first VoLTE call via the data transmission channel in LTE of the first subscriber identity card to a first GSM call via the data transmission channel in GSM of the first subscriber identity card, and map a second VoLTE call via the data transmission channel in LTE of the second subscriber identity card to a second GSM call via the data transmission channel in GSM of the second subscriber identity card.

* * * * *